United States Patent

Spielfiedel et al.

[11] 3,931,485
[45] Jan. 6, 1976

[54] FLUID LEVEL FLOAT SWITCH WITH SEALING DIAPHRAGM

[75] Inventors: Anatole Spielfiedel, Paris; Jean Orven, Frepillon, both of France

[73] Assignee: General Motors Corporation, Detroit, Mich.

[22] Filed: Jan. 13, 1975

[21] Appl. No.: 540,559

[30] Foreign Application Priority Data
Jan. 24, 1974  United Kingdom............... 3275/74

[52] U.S. Cl............. 200/84 R; 73/308; 340/244 A; 200/81.4
[51] Int. Cl.² ..................................... H01H 35/18
[58] Field of Search ........ 73/308, 311, 319; 116/70, 116/118, 124 L; 340/242, 52 C, 244 A, 244 C; 200/81.4, 81.5, 84 R, 302, 308, 83 Y, 83 B, 83 R

[56] References Cited
UNITED STATES PATENTS

| 2,825,895 | 3/1958 | Malagarie............................ 73/308 |
| 2,941,712 | 6/1960 | Cook................................. 200/84 R |
| 3,671,695 | 6/1972 | Wing................................. 200/84 R |
| 3,673,587 | 6/1972 | Baruch............................. 200/84 R |

*Primary Examiner*—Gerald P. Tolin
*Attorney, Agent, or Firm*—Howard N. Conkey

[57] ABSTRACT

A brake fluid reservoir is provided having a flexible sealing diaphragm closing an open end of a chamber for brake fluid. A cover retains the diaphragm on the chamber carries stationary contacts, and a movable contact responsive to movement of a fluid level float, which movable contact, at a predetermined low level of fluid in the chamber, bridges the stationary contacts to complete a low-level warning circuit. Preferably two chambers are provided having a single diaphragm and cover, but a set of contacts for each chamber.

4 Claims, 4 Drawing Figures

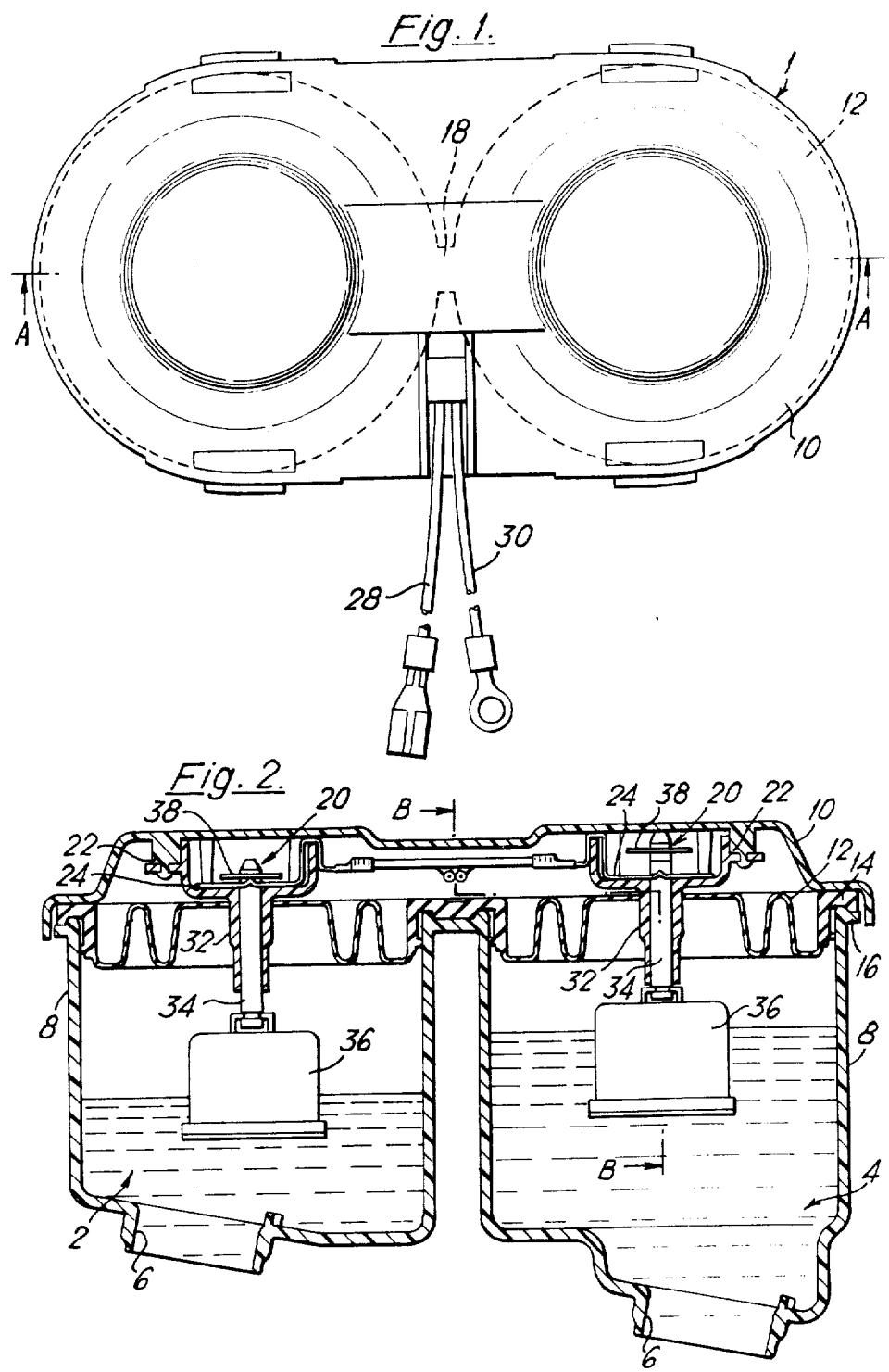

FLUID LEVEL FLOAT SWITCH WITH SEALING DIAPHRAGM

This invention relates to brake fluid reservoirs, suitable for motor road vehicles, and has for its object to provide a convenient fluid level indicator switch for reservoirs incorporating a flexible sealing diaphragm.

According to the invention a brake fluid reservoir comprises a flexible sealing diaphragm fitted over the peripheral rim of the wall of the reservoir and held in position against the rim by means of a reservoir cover pressed over the diaphragm; the underside of the cover having depending from it a casing which contains a pair of stationary electric contacts connected to electric leads, and which has a downwardly projecting guide sleeve passing through the diaphragm and within which sleeve is slidably mounted a rod having at its bottom end a fluid level float and at its top end a movable contact arranged to bridge the stationary contacts when the float has sunk by a given distance.

Conveniently electric leads connected respectively to the two stationary contacts are led out through the reservoir cover.

The appended claims define the scope of the monopoly claimed. How the invention can be performed is hereinafter particularly described with reference to the accompanying drawings, in which:

FIG. 1 is a top plan view of a brake fluid reservoir according to the invention;

FIG. 2 is a sectioned side elevation along the lines A—A of FIG. 1;

Figure 3:
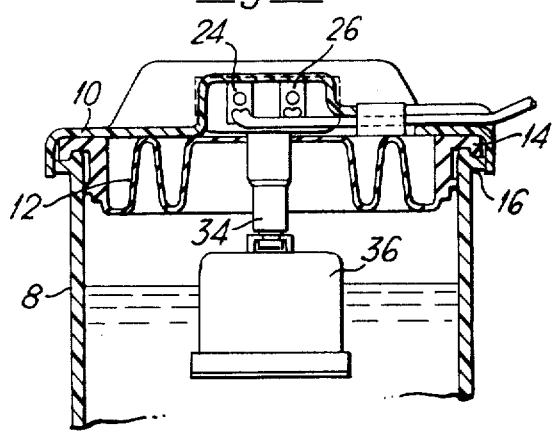
FIG. 3 is a sectioned elevation along the lines B—B of FIG. 2.

The brake fluid reservoir 1 shown in FIGS. 1 and 2 comprises two chambers 2, 4 each having a bottom outlet neck 6 which can be press-fitted by a snap action into apertures in the body of a brake master cylinder (not shown), for supply of brake fluid from the reservoir to the master cylinder. For convenience of description the terms upper and lower, top and bottom and other terms referring to the position of parts of the reservoir will be considered in this specification as referring to the position of those parts when the reservoir is installed in a motor road vehicle. Each chamber 2, 4 has a wall 8 made of plastics material and the chambers are closed by a single plastics or sheet metal cover 10. A common unitary diaphragm 12, of rubber or other suitable elastomeric material, is provided for the reservoir 1. This diaphragm has a beaded rim 14 and this is pressed over an outer peripheral rim 16 of the combined chambers 2, 4. The cover 10 is pressed into locking engagement with the beaded rim 14 of the diaphragm 12 to retain the diaphragm in position and close the chambers 2, 4.

The diaphragm 12 has a reduced-width strap portion 18 extending between two parts of the diaphragm corresponding to the respective chambers 2, 4, thereby permitting assembly operators to handle the two parts of the diaphragm as one piece. The cover 10 for the chambers 2, 4 is, as mentioned above, made in one piece and it provides a protected air ventilator to the two diaphragm parts. The cover also serves to protect the diaphragm.

The diaphragm 12 serves as a seal for the reservoir chambers 2, 4 and prevents moisture from being absorbed by the brake fluid which would lower its boiling point and make it unsafe for use in heavy-duty brake applications. The diaphragm 12 is capable of being shaped into convolutions, as shown, which permits total use of the fluid in the reservoir chambers before any vacuum is developed in the brake system.

Figure 4:
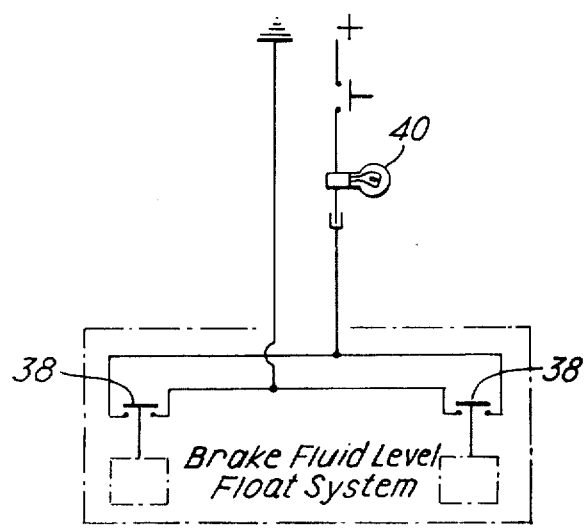
FIG. 4 is a schematic electric circuit diagram for the reservoir float switch.

Each reservoir chamber 2, 4 has a fluid level indicator switch 20 to warn the vehicle driver when the brake fluid needs replenishing. Depending from the underside of the cover 10 are two casings 22, one above the chamber 2 the other above the chamber 4. Each casing contains a pair of stationary electric contacts 24, 26 connected to leads 28, 30, and each casing has a downwardly projecting guide sleeve 32, passing through the diaphragm 12. Within each sleeve a rod 34 is slidably mounted having at its bottom end a fluid level float 36 and at its top end a movable contact 38 arranged to bridge the stationary contacts 24, 26 when the float 36 has sunk by a given distance. FIG. 3 shows the contacts and leads for the chamber 4, the same arrangement is provided for chamber 2. In FIG. 2, chamber 2 shows the position of the float when the fluid level has sunk by the given amount, the resulting downward movement of the rod 34 bringing the movable contact into bridging engagement with the stationary contacts 24, 26 to complete the warning circuit, and operate a warning means such as the light 40 shown schematically in FIG. 4. The contacts there are shown unbridged. The chamber 4 in FIG. 2 shows the position of the float 36 and the movable contact 38 when the fluid in the chamber is at a safe level and the warning circuit remains open.

By the invention there is provided a brake fluid reservoir having a fluid level float switch in an arrangement which enables the float switch to be provided within the reservoir without altering the external dimensions of the reservoir. This has the advantage that the reservoir can be used in the limited space that is often all that is available for a brake master cylinder and its associated reservoir, and so obviates the need for expensive and extensive re-design of components to permit fitment of the reservoir and its fluid level warning switch to the vehicle. Further the cover protects the switch from damage which might be caused by careless handling of the reservoir, and removal of the cover to replenish the reservoir means that the switch is removed as a unit and does not have to be dismantled, and then re-assembled, with the risk then of damage to the switch.

We claim:

1. A brake fluid reservoir assembly comprising:
   a reservoir chamber having a base and a side wall upstanding from the base and terminating in a peripheral rim bounding an open end of said chamber;
   a flexible sealing diaphragm fitted over said peripheral rim and closing said open end;
   a reservoir cover fitted over said diaphragm and retaining said diaphragm on said peripheral rim;
   a casing depending from the underside of said reservoir cover towards said diaphragm;
   a pair of stationary electric contacts located in said casing;
   electric leads of a low-fluid-level warning circuit connected to said contacts;
   a guide sleeve projecting from said casing and passing sealingly through said diaphragm into said chamber;
   a rod slidably mounted in said guide sleeve, and having a lower end with a fluid float secured thereto, the rod having an upper end upon which is mounted a movable contact, the rod having a length such that at one level of fluid in said chamber said float supports said rod with said movable contact above and out of engagement with said stationary contacts, and at a predetermined lower level of fluid in said chamber said movable contact comes into engagement with said stationary contacts to complete said low-fluid-level circuit.

2. A brake fluid reservoir assembly as defined in claim 1, wherein said electric leads connected to said stationary contacts are led out through said reservoir cover.

3. A brake fluid reservoir assembly comprising:
two reservoir chambers, each having a base and a side wall upstanding from said base and terminating in a peripheral rim bounding an open end of a respective one of said chambers;
a flexible sealing diaphragm fitted over said peripheral rims and closing said open ends;
a reservoir cover fitted over said diaphragm and clampingly retaining said diaphragm on said peripheral rims;
two casings depending from the underside of said reservoir cover towards said diaphragm,
two pairs of stationary electric contacts, located one pair in each casing;
electric leads of a low-fluid-level warning circuit connected to said stationary electric contacts;
a pair of guide sleeves, one of the pair projecting from one of said casings and passing sealingly through said diaphragm into one of said reservoir chambers, the other of said pair projecting from the other of said casings and passing sealingly through said diaphragm into the other of said reservoir chambers;
two rods, each slidably mounted in a respective one of the pair of guide sleeves, each rod having a lower end and an upper end;
two floats, one in each reservoir chamber and secured respectively to said lower ends of said rods in said chambers;
two movable electric contacts each mounted on a respective one of said upper ends of said rods;
each rod having a length such that at one level of fluid in said respective reservoir chamber said float supports said rod with said movable electric contact above and out of engagement with said stationary electric contacts, and at a predetermined lower level of fluid in said reservoir chamber said movable electric contact comes into engagement with said stationary electric contacts to complete said low-fluid-level circuit.

4. A brake fluid reservoir assembly as defined in claim 3, wherein said electric leads connected to said stationary electric contacts are led out through said cover.

* * * * *